(12) United States Patent
Nikkanen et al.

(10) Patent No.: US 6,565,313 B2
(45) Date of Patent: May 20, 2003

(54) BLEED DEFLECTOR FOR A GAS TURBINE ENGINE

(75) Inventors: John P. Nikkanen, West Hartford, CT (US); Edward F. Migliaro, Bristol, CT (US); Steven H. Zysman, Hebron, CT (US); Thomas B. Avis, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 14 days.

(21) Appl. No.: 09/971,404

(22) Filed: Oct. 4, 2001

(65) Prior Publication Data

US 2003/0068223 A1 Apr. 10, 2003

(51) Int. Cl.⁷ ................................................ F01B 25/00
(52) U.S. Cl. .................... 415/144; 415/208.1; 415/914
(58) Field of Search ............................. 415/144, 145, 415/914, 208.1; 60/226.1, 785

(56) References Cited

U.S. PATENT DOCUMENTS 4,537,277 A   8/1985   Bryce

FOREIGN PATENT DOCUMENTS

DE   19959596 A1  *  6/2001  ........... F01D/17/10

* cited by examiner

Primary Examiner—Edward K. Look
Assistant Examiner—Dwayne J. White
(74) Attorney, Agent, or Firm—Bachman & LaPointe, P.C.

(57) ABSTRACT

The present invention relates to a bleed deflector for a gas turbine engine. The bleed deflector comprises an inlet portion for receiving bleed air from the engine, a perforated top plate for discharging the bleed air into a duct, and an aerodynamically shaped strut for positioning the perforated top plate above an inner wall of the duct to allow dilution air to flow beneath the top plate.

14 Claims, 3 Drawing Sheets

BLEED DEFLECTOR FOR A GAS TURBINE ENGINE

BACKGROUND OF THE INVENTION

The present invention relates to a bleed deflector for use in a gas turbine engine.

Current high pressure compressor bleed discharge designs consist of either a tube or a vaned deflector which directs high temperature engine bleed air into a fan duct. Such an arrangement often leads to structural problems caused by the bleed air plume impacting the inner and outer fan duct walls, exceeding their temperature limits. Typical bleed discharge air is up to 800° F. to 1000° F., while fan air is up to 240° F. Duct material temperature limits are on the order of 300° F. to 350° F.

In the past, a silencer for high velocity gas flow in a gas turbine engine has been proposed. One such silencer is shown in U.S. Pat. No. 4,537,277 to Bryce. As shown therein, the Bryce silencer includes a flow passage and a domed perforated plate which terminates the flow passage. The perforated portions of the plate are distributed over the plate so as direct gas from the passage as a plurality of divergent jets, so that noise is produced with a frequency at maximum intensity in a range of the audible spectrum at which human auditory perception is relatively insensitive. The domed plate portion of the silencer is mounted flush with the inner wall of the bypass duct.

It has been found that devices which utilize flush outlets cause inner duct wall burns because cooler fan air cannot get immediately downstream of the outlet to dilute the hot discharge flow from the device.

Attempts have been made to develop a bleed deflector which avoided the problem of inner duct wall burns. One such attempt is shown in FIGS. 1 and 2. In this bleed deflector, an aerodynamically shaped deflector 10 has outlets 12 in its side walls which separate the bleed air discharge into two lateral plumes 14 and 16. Each of the outlets 12 has discrete holes which can be angled to direct the jets in a desired direction. This deflector however did not work because it was not possible to jet enough flow out of the bleed deflector. This, there remains a need for a bleed deflector which adequately discharges the bleed air from a compressor of a gas turbine engine.

SUMMARY OF THE INVENTION

Accordingly, it is an object of the present invention to provide an improved bleed deflector for use in a gas turbine engine.

It is a further object of the present invention to provide a bleed deflector which substantially eliminates wall burns in a fan duct.

The foregoing objects are attained by the bleed deflector of the present invention.

In accordance with the present invention, a bleed deflector broadly comprises an inlet portion for receiving bleed air, an outlet portion for discharging the bleed air into a duct, and means for positioning said outlet portion above an inner wall of the duct and for creating a linear flow path for the discharge air between the inlet portion and the outlet portion.

Other details of the bleed deflector of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
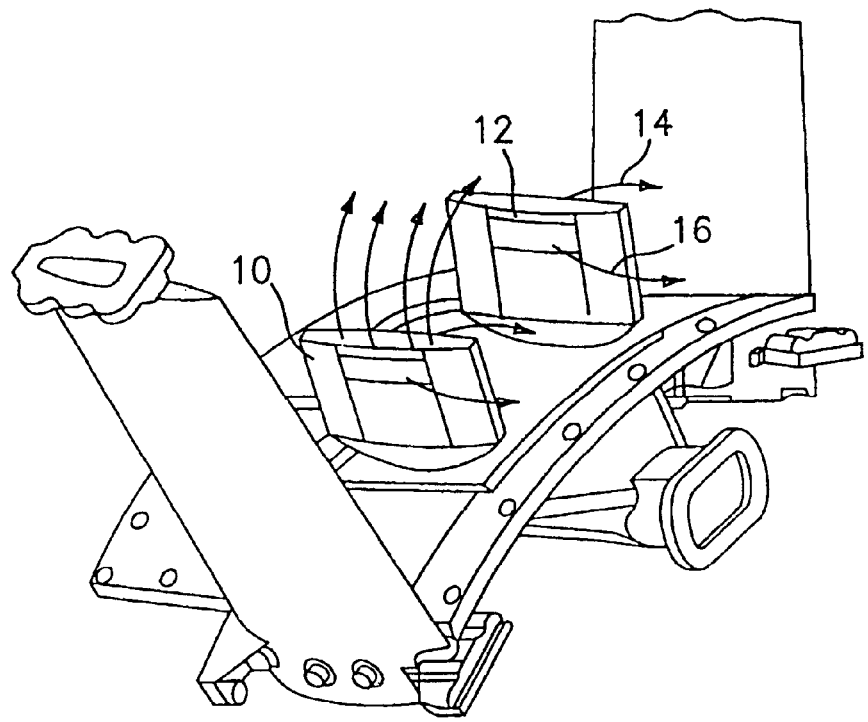
FIG. 1 is a perspective view of a prior art bleed deflector.
Figure 2:
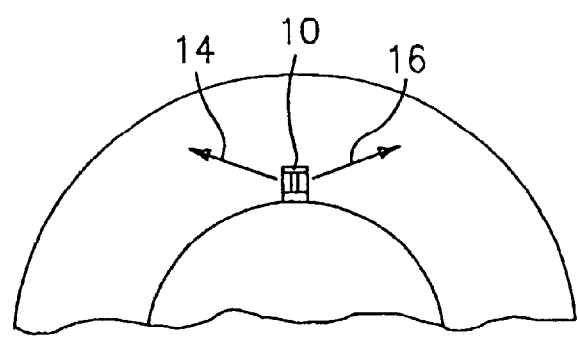
FIG. 2 is a fan duct cross section showing the prior art bleed deflector positioned within a fan duct.

Referring now to FIGS. 3 through 7, a bleed deflector 20 in accordance with the present invention is illustrated. The bleed deflector 20 has an inlet portion 22 for receiving bleed air from a compressor stage (not shown) of a gas turbine engine. The bleed deflector 20 further has an outlet portion 24 and a member 26 for positioning the outlet portion 24 above an inner wall 28 of a fan duct 30.

The positioning member 26 is aerodynamically shaped to minimize drag and to allow for a maximum amount of dilution air, generated by the engine fan (not shown), beneath the outlet portion 24. This eliminates contact of the hot bleed gasses with the duct inner wall 28 during low and high power operation of the engine, or should the bleed valve (not shown) leak.

Figure 3:
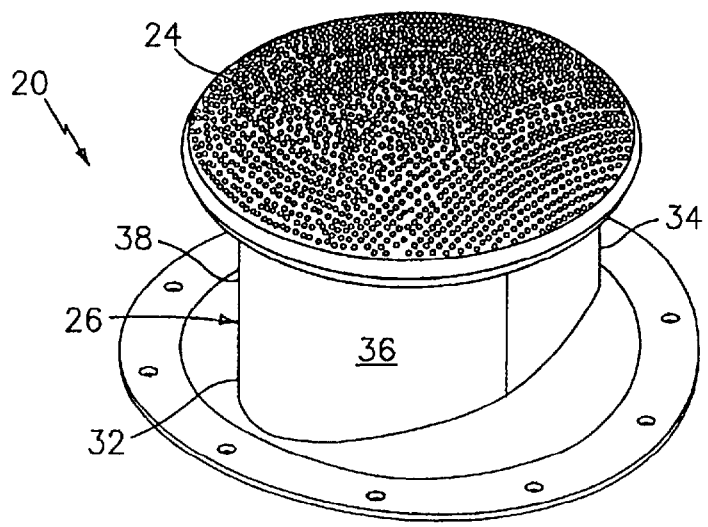
FIG. 3 is a perspective view of a bleed deflector in accordance with the present invention.
Figure 4:
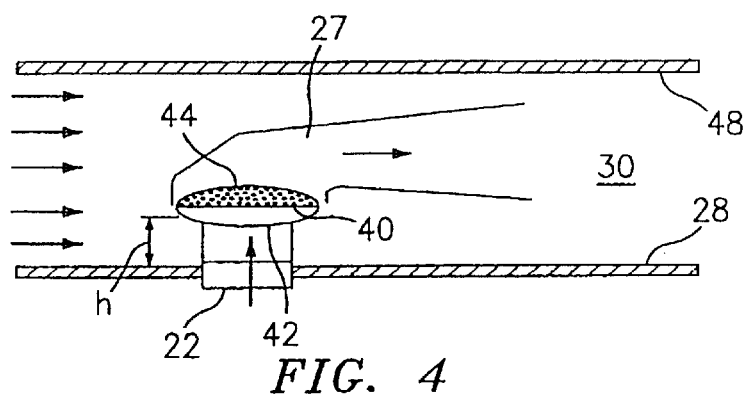
FIG. 4 is a plan view of the bleed deflector of FIG. 2 installed within a fan duct.
Figure 5:
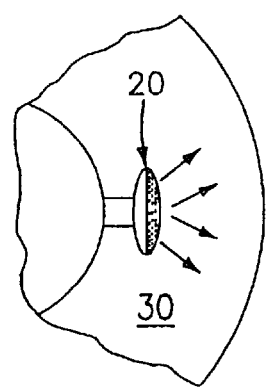
FIG. 5 is a fan duct cross section showing the bleed deflector of the present invention.

As can be seen from FIGS. 3–5, the positioning member 26 comprises a strut having a leading edge 32, a trailing edge 34, and arcuately shaped, non-linear side surfaces 36 and 38 each extending between the leading edge 32 and the trailing edge 34. Further, the positioning member 26 has a height h sufficient to insure that the plume 27 from the outlet portion 24 does not contact the inner wall 28.

The outlet portion 24 includes a base portion 40 integrally formed with or joined to the upper end of the positioning member 26. The base portion 40 is arcuately curved along its lower surface 42 to further improve the air flow within the duct 30.

Figure 6:
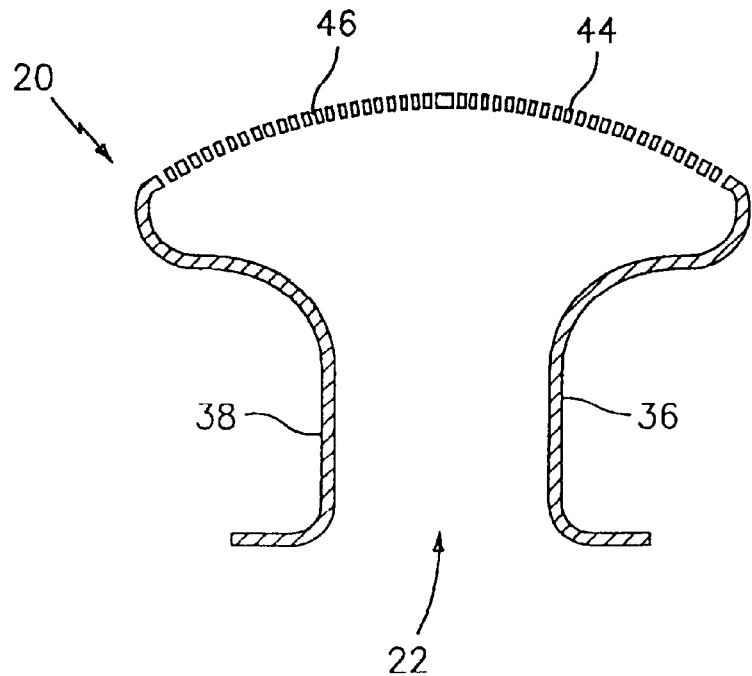
FIG. 6 is a sectional view of the bleed deflector of FIG. 3 taken along a plane extending from one side to another side of the bleed deflector.
Figure 7:
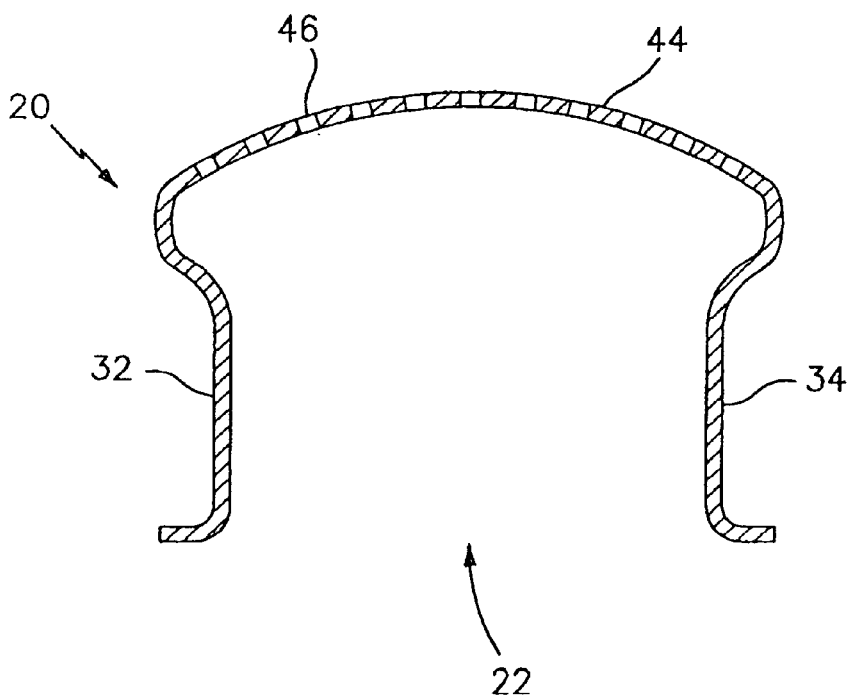
FIG. 7 is a sectional view of the bleed deflector of FIG. 3 taken along a plane extending from a leading edge of the bleed deflector to a trailing edge of the bleed deflector.

The outlet portion 24 further includes a dome shaped perforated top plate 44 through which the bleed air is discharged into the duct 30. The perforated top plate 44 includes a plurality of discrete holes 46. Each hole 46 is sized to prevent the bleed air discharge from contacting the outer wall 48 of the fan duct 30. Further, each hole 46 is not perpendicular to the surface of the perforated top plate 44. Instead, each hole 46 is angled to enhance turning of the exhaust plume 27 in a circumferential direction when looking from the front or rear of the engine. The interior shape of the side surfaces 36 and 38, as shown in FIGS. 6 and 7, is such that the bleed air is fed to all of the holes 46.

The perforated top plate 44 has been found to be useful in diffusing the bleed air as it travels from the inlet portion 22 to the outlet portion 24. The perforated top plate 44 also distributes the hot bleed discharge gasses over an area that produces an optimum plume shape and size.

The bleed deflector of the present invention has particular utility with composite nacelles because such nacelles burn much more easily than metallic nacelles. The bleed deflector of the present invention is quite beneficial during idle times when compressor bleed discharge temperature is quite hot.

It is apparent that there has been provided in accordance with the present invention a bleed deflector for a gas turbine engine which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A bleed deflector for a gas turbine engine comprising:
   an inlet portion for receiving bleed air from said engine;
   outlet means for discharging bleed air into a duct;
   means for creating a flow of cooler air beneath said bleed air discharging from said outlet means and for discharging said bleed air from said outlet means so said bleed air does not come into contact with an inner wall of said duct;
   said creating and discharging means comprising means for positioning said outlet means above an inner wall of said duct and for creating a flow path between said inlet portion and said outlet means; and
   said outlet means being located at a top of said positioning means.

2. A bleed deflector according to claim 1, wherein said flow of cooler air comprises a flow of dilution air and said positioning means comprises means for minimizing drag and for providing a maximum amount of said dilution air under said outlet means.

3. A bleed deflector according to claim 1, wherein said outlet means comprises means for separating said bleed discharge into a plurality of discrete plumes elevated from said duct inner wall.

4. A bleed deflector according to claim 3, wherein said bleed discharge separating means comprises a perforated top plate having a plurality of openings.

5. A bleed deflector according to claim 4, wherein each of said openings is angled to enhance turning of said bleed air to form said plumes.

6. A bleed deflector according to claim 4, wherein each said opening is sized to prevent said bleed air exiting from said outlet means from impacting and burning an outer and said inner wall of said duct.

7. A bleed deflector for a gas turbine engine comprising:
   an inlet portion for receiving bleed air from said engine;
   outlet means for discharging bleed air into a duct;
   means for positioning said outlet means above an inner wall of said duct and for creating a flow path between said inner portion and said outlet means;
   said outlet means being positioned on top of said positioning means;
   said positioning means comprising means for minimizing drag and for providing a maximum amount of dilution air under said outlet means; and
   said drag minimizing and dilution air providing means comprising an aerodynamically shaped strut extending between said inlet portion and said outlet means.

8. A bleed deflector for a gas turbine engine comprising:
   an inlet portion for receiving bleed air from a portion of said engine;
   a perforated top plate for discharging bleed air into a duct;
   said perforated top plate being substantially axially aligned with said inlet portion;
   a strut connected to said inlet portion for positioning said perforated top plate above an inner wall of said duct; and
   said strut having a height sufficient to allow a flow of cooler dilution air to flow between said inner wall and said discharged bleed air.

9. A bleed deflector according to claim 8, wherein said top plate is dome shaped.

10. A bleed deflector according to claim 8, wherein said strut position said perforated top plate at a height above the inner wall so that dilution air can flow beneath said perforated top plate.

11. A bleed deflector according to claim 8, wherein said top plate has a plurality of openings and each of said openings being angled to create at least one plume of discharge air within said duct.

12. A bleed deflector according to claim 11, wherein each said opening is sized to prevent said at least one plume from contacting an outer wall of said duct.

13. A bleed deflector for a gas turbine engine comprising:
   an inlet portion for receiving bleed air from a portion of said engine;
   a perforated top plate for discharging said bleed air into a duct;
   said perforated top plate being substantially axially aligned with said inlet portion;
   a strut connected to said inlet portion for positioning said perforated top plate above an inner wall of said duct; and
   said strut having a leading edge, a trailing edge, and two aerodynamically shaped side surfaces extending between said leading edge and said trailing edge.

14. A bleed deflector according to claim 13, wherein each of said side surfaces is non-linear.

* * * * *